ELECTRIC PULSE RESPONSIVE COUNTER

Filed July 3, 1951 3 Sheets-Sheet 1

Inventor
V. J. TERRY,
D. S. RIDLER, D. A. WEIR
By [signature]
Attorney

April 16, 1957 V. J. TERRY ET AL 2,788,940

ELECTRIC PULSE RESPONSIVE COUNTER

Filed July 3, 1951 3 Sheets-Sheet 2

Inventor
V. J. TERRY
D. S. RIDLER
D. A. WEIR
By [signature]
Attorney

April 16, 1957 V. J. TERRY ET AL 2,788,940

ELECTRIC PULSE RESPONSIVE COUNTER

Filed July 3, 1951 3 Sheets-Sheet 3

*Inventor*
V. J. TERRY
D. S. RIDLER
D. A. WEIR
By [signature]
*Attorney*

United States Patent Office 2,788,940
Patented Apr. 16, 1957

2,788,940

ELECTRIC PULSE RESPONSIVE COUNTER

Victor John Terry, Desmond Sydney Ridler, and Donald Adams Weir, London, England, assignors to International Standard Electric Corporation, New York, N. Y.

Application July 3, 1951, Serial No. 235,068

Claims priority, application Great Britain April 1, 1948

10 Claims. (Cl. 235—92)

Figure 1A:
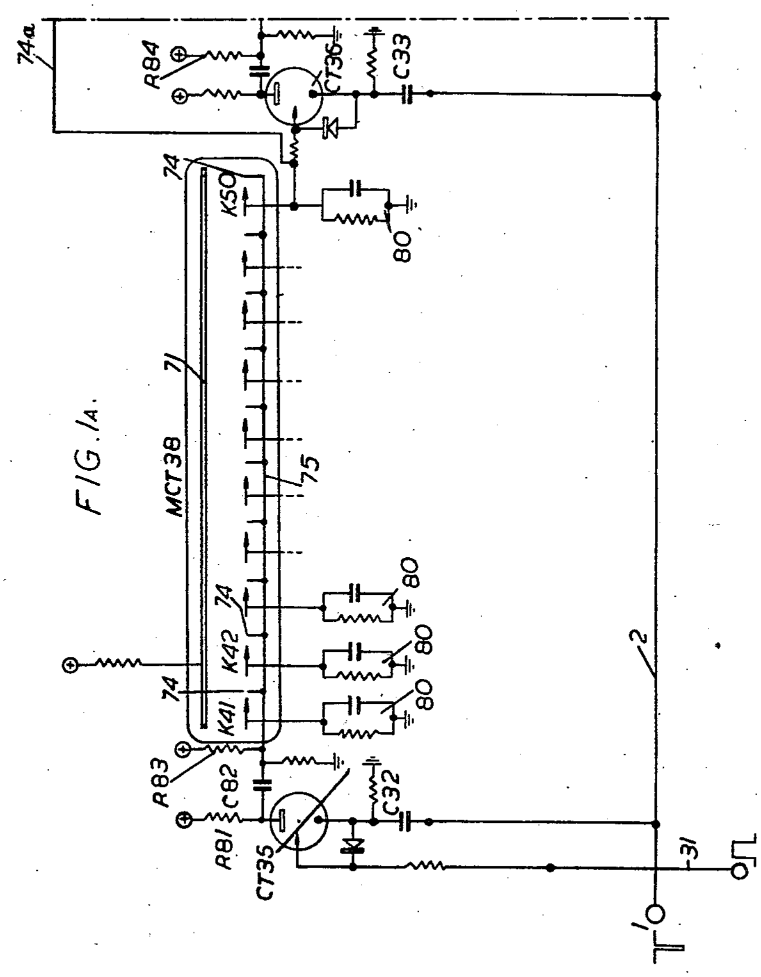

This application is a continuation-in-part of our co-pending application bearing Serial No. 84,104 filed March 29, 1949.

The invention relates to electric pulse responsive circuits comprising at least three groups of static electrical switches the groups being arranged in ascending denominational orders and each group being operable cyclically in sequential fashion in response to pulses applied thereto.

Difficulty has been experienced where high pulse repetition frequencies are concerned due to the occasional need for a plurality of successive groups of switches each to feed a pulse forward to the next group in response to a single pulse incoming to the first group. In a decade counter of a kind previously available, for example, 99 pulses may have been received and registered: the next incoming pulse has then had to cause a device of the first group to respond, a pulse has to be passed forward to the second group, the next device in order in that group has to respond, a pulse has to be passed forward to the third group and a device there has to respond before the indication 100 is given. All this must be accomplished before the next incoming pulse is received by the first group if an accurate record is to be quickly obtained. In a frequency dividing circuit, the delay in response of succeeding groups in such circumstances, prevents an output pulse frequency of high accuracy being obtained at all, nor can the output frequency be kept in constant phase relationship with the input frequency.

The object of the invention therefore is to provide electric pulse responsive circuits which are able to operate at higher speeds than hitherto and which avoid the above difficulty.

Use has been made of static electrical switches.

The term "static electrical switch," as used in this specification, is meant to embrace such devices as thermistor trigger circuits, hot or cold cathode discharge tubes, hard tube trigger circuits, cathode ray tubes and transistors.

It is thought that the following is a generic definition of the term, but in any case this attempt at definition must not be interpreted to exclude any of the above specific examples.

A static electrical switch is a device having a conductance which is capable of a change from one stationary value to a different stationary value, the said change in conductance being caused by an excitation of electrical charges within the device and resulting only in the movement of such electrical charges.

Furthermore a number of such switches may each be in the form of electrodes defining a cold cathode gas discharge gap, these gaps all being contained in one envelope. A group of static electrical switches can therefore be interpreted as covering a multi-gap, gas-filled discharge tube. These tubes have been previously described.

One feature of the invention is an electric pulse responsive circuit comprising at least three groups of static electric switches, the groups being arranged in ascending denominational order and each group being operable cyclically in sequential fashion in response to pulses applied thereto, wherein each operation of a switch in the third group or in the succeeding groups if any, is directly controlled by each of the preceding groups.

A second feature of the invention is an electric pulse responsive circuit comprising at least three groups of static electric switches, the groups being arranged in ascending denominational order and each group being operable cyclically in sequential fashion in response to pulses applied thereto, wherein each operation of a switch in the third group, or in the succeeding groups, if any, occurs simultaneously with the actuation of the last switch in each of the preceding groups. The term "actuation" is used to define either the turning on or the turning off of the switch.

Figure 1B:
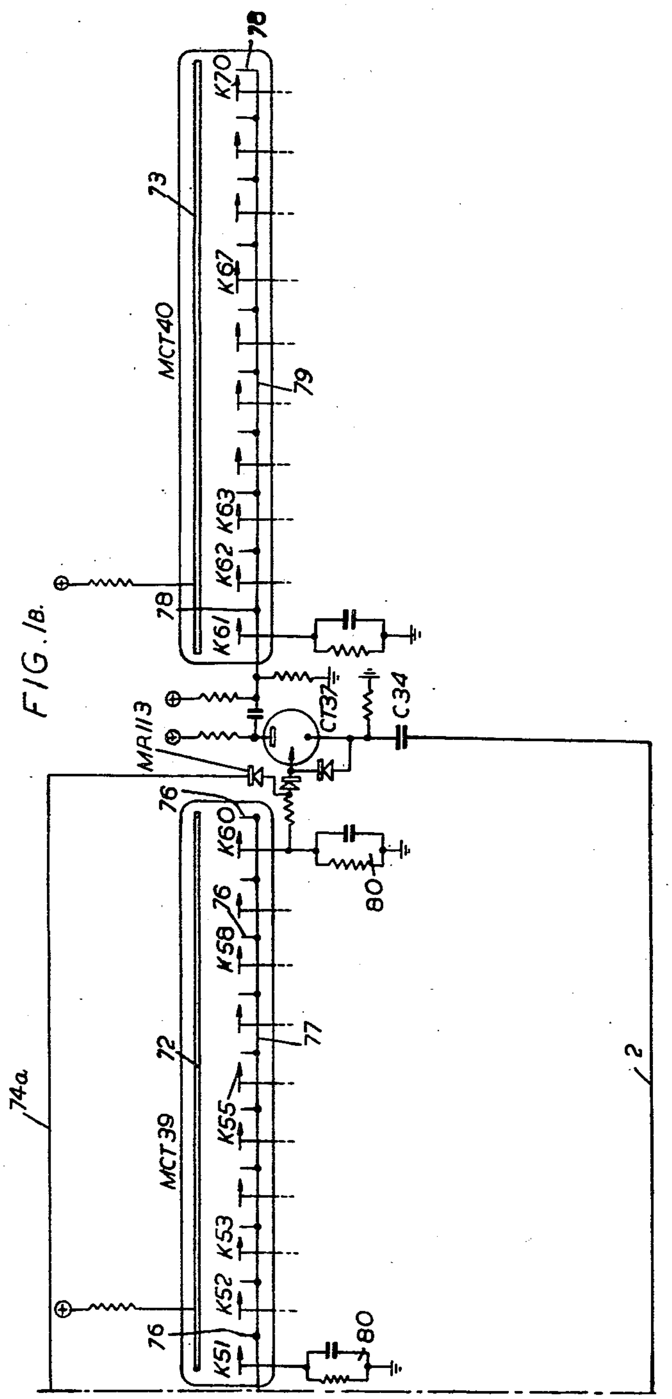
Figure 2:
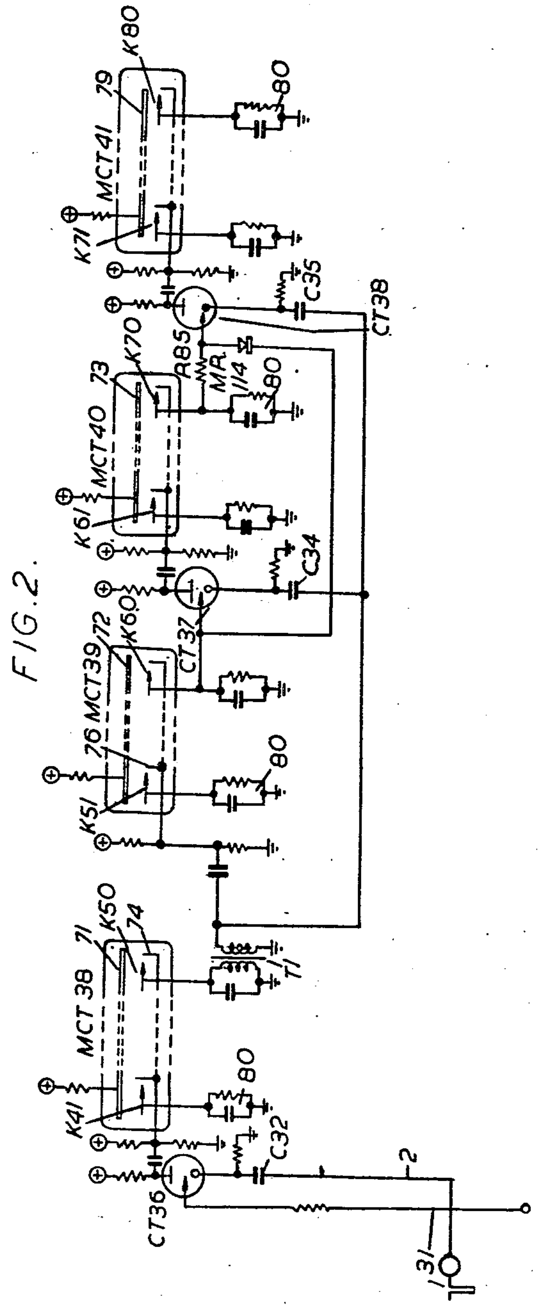

The invention will now be described with reference to one embodiment thereof shown in the accompanying drawings in which:

Figs. 1A and 1B together show a timing circuit. The circuit of Fig. 1B should be placed at the right side of the Fig. 1A circuit;

Fig. 2 shows a generally similar timing circuit in which certain modifications have been incorporated.

Decade and binary counters are commercially available which use electronic devices, for example, hard tubes or hot or cold cathode gas-filled discharge tubes. It is common for a train of pulses to be received on a group of such devices each of which responds in turn. There are usually provided further groups of electronic devices also, in which case the number of devices in a group equals the digits in the denominational order employed. Each group except the first is then fed with pulses from the group of the preceding order. For instance, in a decade counter, each cycle of ten incoming pulses operates in turn the devices of the first group, and a pulse is fed therefrom to the tens order group. By such means, an accumulated total of pulses received may be stored and indicated by the operated and non-operated condition of the devices of different groups at any time. It is frequently found desirable to insert further electronic devices into the circuit each between two successive groups, say for amplifying the output pulse from one group before its application to the next group where it causes the next device in sequence to respond.

The timing circuit of Fig. 1A and Fig. 1B will be seen to comprise three multi-gap, cold cathode, gas-filled discharge tubes MCT38–40. Incoming pulses are fed to the first of these tubes MCT38 whose main gaps are arranged to become discharging in turn. When one particular cathode becomes conducting, a condition is applied to a cold cathode gas-filled discharge tube CT36, associated with multi-gap tube MCT39, which causes a single pulse to be applied to that multi-gap tube MCT39 in which the discharging condition moves from one main gap to the next in sequence. Similarly, one particular cathode of MCT39 is arranged on becoming conducting to apply a condition to another cold cathode tube CT37 by means of which a pulse may be applied to multi-gap tube MCT40. In this embodiment of the invention, it will be noticed that incoming pulses are not only applied to the first multi-gap tube but also to the tubes CT36 and CT37 over lead 2. The tube CT35 and its associated circuit provide a starting arrangement.

The general purpose of the multi-gap tubes and their associated circuits is to count pulses incoming over lead 2. For every ten pulses received by MCT38 ten steps are taken by the discharging condition within the tube and one such step is taken within the tube MCT39. A similar relationship exists between the tubes MCT39 and MCT40 respectively. Hence one step is taken in MCT40 for every hundred pulses received over lead 2.

Having appreciated this pulse responsive circuit in outline, attention will now be turned to a more detailed description of the circuit arrangement and its operation.

The pulses to be counted appear on lead 2 from a source of negative-going pulses 1. A positive potential on lead 31 is needed to start the timing circuit into operation and the obtaining of such a positive potential is more fully explained in the said copending parent application of which this application is a continuation-in-part.

The pulses to be counted are applied at terminal 1 to lead 2 and are applied over condensers C32, C33 and C34 to the cathodes of cold cathode tubes CT35, CT36 and CT37, respectively. The counting operation is performed by the three multi-cathode tubes MCT38, MCT39 and MCT40. Each of these tubes MCT38, MCT39 and MCT40 is of the type described in U. S. Patent No. 2,553,585 issued to G. H. Hough. In the tube MCT38, ten cathodes K41 to K50 are arranged in circular formation so that cathode K50 is adjacent to cathode K41, though for purposes of circuit illustration the cathodes are shown arranged in line. Similarly, tube MCT39 is provided with ten cathodes K51 to K60, and tube MCT40 with the ten cathodes K61 to K70. Although the cathodes are arranged in a circle, the ionisation coupling from one gap is greater in the direction of the array from cathode K41 to K50 than in the other and similarly in the other two tubes. Tube MCT38 is provided with an anode 71 and tubes MCT39 and MCT40 are provided with anodes 72 and 73, respectively. Between the cathodes of each adjacent pair of cathodes in a tube there is a transfer electrode. All the transfer electrodes in tube MCT38 are denoted by the same reference numeral 74 and are connected in common to conductor 75. The extreme right-hand transfer electrode 74 of the tube MCT38 is positioned between the cathode K50 and the cathode K41, as above stated.

Similarly, transfer electrodes 76 are connected between the various cathodes K51 to K60 in tube MCT39 and are all connected to a common lead 77. Likewise, in tube MCT40 transfer electrodes 78 are provided between the various cathodes K61 and K70 and are connected to a common lead 79. The various cathodes K41 to K50, K51 to K60 and K61 to K70 are each separately connected to ground over separate time-constant circuits each denoted by the reference numeral 80. Each time constant circuit 80 consists of a resistance and a condenser in parallel and the time constant thereof is greater than the duration of each of the pulses from a source (not shown) applied to terminal 1 (Fig. 1A). In order not to unduly complicate the circuit diagram only some of the time constant circuits 80 have been shown.

Referring for a moment to Fig. 2A of said copending application, when the tube CT23 is made conducting, a positive potential appears on the conductor 31 and is applied to a control electrode of the three element gas filled cold cathode tube CT35. This is the source of positive pulse applied to the conductor 31 in Fig. 1A of this application. Negative pulses applied to the terminal 1 are applied over conductor 2 and condenser C32 to the cathode of the tube CT35. This results in the tube CT35 becoming immediately conducting and the passage of current through the resistance R81 connected in the anode circuit of the tube. This results in the application of a more positive potential over the conductor 75 to the transfer electrodes 74 of the tube MCT38. Initially, the gap between the cathode K41 and the anode 71 of this tube is conducting and the application of potential to that transfer electrode 74 which is between the cathodes K41 and K42 results in the transfer of the discharge from the gap between cathode K41 and anode 71 to one across the gap between the cathode K42 and the anode 71. The discharge between the cathode K41 and the anode 71 is at the same time extinguished. Similarly, the gap between cathode K51 and anode 72 of tube MCT 39 and the gap between cathode K61 and anode 73 of tube MCT40 are initially conducting.

These events take place during the time of the positive pulse that is applied to conductor 31, the pulse length, 40 or 50 microseconds, being adjusted to be sufficient for this purpose. It is to be understood that the tube CT35 can only become conducting when a positive potential is applied over conductor 31 coincidentally with the application of a negative pulse over conductor 2. Upon the cessation of the pulse applied over conductor 2, the tube CT35 becomes extinguished. Whilst the bias on the conductor 31 persists, the tube CT35 becomes conducting on each pulse applied over conductor 2, and therefore applies a pulse, positive-going in this case, to a transfer electrode 74 of the tube MCT38. The positive pulse thus applied is sufficient in conjunction with the bias applied over the resistor R83 to cause the transfer of the discharge in MCT38 from one cathode to the next in the direction from left to right in the drawing. On the ninth pulse over the conductor 2 the discharge is transferred to cathode K50 and on the 10th pulse, a discharge reappears on cathode K41.

After the disappearance of the ninth pulse and whilst the cathode K50 is still discharging, the potential at the upper end of the time constant circuit 80 connected to cathode K50 rises sufficiently to apply a positive potential to the control electrode of tube CT36. The result is that when the tenth pulse is applied over conductor 2 and thus over condenser C33 to the cathode of tube CT36, this tube becomes conducting and acts to cause the application of a positive potential to conductor 77 of tube MCT39, which is added to the potential of the bias source applied over resistance R84 and so causes the pre-existing discharge in the gap between cathode K51 and anode 72 to be transferred to the gap between the next cathode K52 and the anode 72. At the same time, the effect of the same pulse applied through the tube CT35 to conductor 75 causes the discharge to be transferred from cathode K50 of tube MCT38 to the next cathode in the circle, namely, K41. The nineteenth pulse over conductor 2 causes cathode K50 to discharge and the twentieth pulse causes cathodes K41 and K53 to discharge. The fortieth pulse causes cathodes K41 and K55 to discharge.

The ninetieth pulse causes K60 and K41 to become conducting and nine further pulses will effect a discharge across the gap between the anode 71 and cathode K50 of the tube MCT38. With K50 again conducting, a positive potential is applied to the trigger electrode of tube CT36. Because K60 is conducting a similar potential is applied to tube CT37. There is here however, an important difference. Tube CT36 is arranged to fire whenever the potential condition derived from K50 of the preceding tube MCT38 coincides with a negative pulse on lead 2 which is fed over condenser C33. This occurs on reception of the next incoming pulse, that is, the hundredth. The tube CT37 on the other hand, will not fire simply on the coincidence of a potential application derived from K60 and an incoming pulse from lead 2 over condenser C34. It is required also to have a potential applied from the cathode K50 of tube MCT38 via conductor 74A which blocks the rectifier MR113. When this rectifier is not blocked, a potential from K60 causes a current flow to earth through MR113 in the forward direction and the time constant circuit 80 connected to cathode K50 of tube MCT38. Hence an insufficient potential is built up on the trigger electrode of CT37 to strike that tube except when both K50 and K60 are conducting and when an incoming pulse is received. If the dependence on K50 being conducting was not provided, then as soon as K60 became conducting after the ninetieth pulse was received, the next incoming pulse would cause CT37 to fire and MTC40 would take one step on the ninety-first pulse which is incorrect. As it is, after the ninety-ninth pulse has been received, tubes CT36 and CT37 are both primed and the hundredth pulse causes these tubes simultaneously to strike and pass forward a pulse each to its respective associated multi-gap tube. Hence, immediately after the hundredth pulse has been received, the cathodes K41, K51 and K62 are conducting, K61 having originally been the conducting cathode in the tube MCT40. Removal of the priming potentials from the trigger electrodes and the incoming pulse from the cathodes of CT36 and CT37 results in their extinguishment.

The counting of impulses proceeds as before and the hundred and ninety-ninth pulse results in cathodes K50, K60 and K62 being conductive simultaneously. The next pulse received steps the discharge to K41, K51 and K63 due to the firing of CT36 and CT37, respectively. In the timing circuit shown, the counting tubes MCT38—MCT40 return to their original condition on receipt of the thousandth pulse.

It will be seen that there is no cumulative delay. The same incoming pulse that allows one step to be taken by MCT39 also allows MCT40 to do likewise. There is no waiting for MCT38 to complete a cycle, pass forward a pulse which enables MCT39 to complete its cycle before another pulse is passed forward and one step taken by MCT40. Both MCT39 and MCT40 take a step each simultaneously.

In the above description the incoming pulses have been fed to both cold cathode tubes CT36 and CT37 in order that the gating arrangements of which they form a part may be caused to pass pulses forward to the associated multi-gap tubes MCT39 and MCT40 respectively. In one possible modification of the embodiment, the incoming pulses would be applied to the first multi-gap tube MCT38 only. This modification is shown in Fig. 2 in which four multi-gap gas-filled cold cathode discharge tubes are connected so as to operate in cascade. Reference letters and numerals for similar circuit components are identical in Fig. 1 and Fig. 2. The circuit of the latter includes the extra tube MCT41 which responds once for every thousand pulses received over lead 2 from source 1. The operation will now be described.

After a starting potential has been applied over lead 31, tube CT36 will thereafter fire each time a pulse is received over lead 2. The anode circuit of the tube CT36 generates a negative-going pulse when the tube strikes and this causes one step to be taken by the tube MCT38. With the initial discharge effected between anode 71 and cathode K41, the receipt of nine pulses will, as before, cause cathode K50 to become conducting. The start of the flow of current through the primary of transformer T1 in the cathode circuit results in a positive pulse being induced in the secondary and this is applied to the transfer electrodes 76 of the tube MCT 39 and over condensers C34 and C35, respectively, to the tubes CT37 and CT38. Positive pulses have no effect on any of these three tubes since the condensers C34 and C35 are connected to the respective cathodes of tubes CT37 and CT38. When the tenth pulse is received, MCT38 takes one step and K50 ceases to conduct, K41 taking over the discharge. The cessation of current flow through the primary of transformer T1 causes a negative pulse to be passed to the transfer electrodes 76 of tube MCT39 and to the cathodes of tubes CT37 and CT38. Assuming the initial discharges in tubes MCT39—MCT41 were between their respective anodes 72, 73 and 79 and cathodes K51, K61 and K71, then one pulse applied to MCT39 will cause the discharge therein to move one step. The other two multi-gap tubes will remain as they were for with neither tube CT37 nor CT38 primed at its trigger electrode off the last cathode of the previous tube, neither will fire and no pulses will be applied to MCT40 and MCT41.

When ninety-nine pulses have been received, K50 and K60 are conducting, so that tube CT37 is primed by the potential developed across the K60 time-constant cathode circuit 80. On receipt of the hundredth pulse, the K50 discharge steps to K41 and a negative impulse is induced in the secondary of transformer T1. The application of the negative impulse to the cathode by tube CT37 coinciding with the positive bias received from K60, fires that tube and a negative pulse is thereby passed forward to cause one step from K61 to K62 to be taken in tube MCT40. One step is also taken in tube MCT39 as a result of the application of a negative pulse from transformer T1 to the transfer electrodes 76.

After receipt of nine hundred and ninety-nine pulses, cathodes K50, K60 and K70 are conducting and tubes CT37 and CT38 are both primed. CT37 is primed, as before, from the cathode circuit of cathode K60. Tube CT38 is primed because of the coincidence of potential applications arising from K60 and K70 being conducting. That from K60 blocks rectifier MR114 and only when this rectifier is blocked is the potential due to K70 conducting applied over resistance R85 to tube CT38. The resistance R85 and the rectifier MR114 together form a coincidence gate circuit, as has previously been described On receipt of the hundredth pulse, MCT38—MCT40 all take one step and the negative pulse from the transformer T1 also allows CT38 to fire and MCT41 to take one step. Hence, commencement of movement of discharge in tube MCT38 immediately and simultaneously causes MCT39—MCT41 each to move their discharging condition one step.

If the negative-going pulses obtained from the secondary of transformer T1 are of insufficient amplitude or power, amplifying means may be incorporated, so as to obtain the required pulses for application to tubes MCT39, CT37 and CT38.

The tube CT36 with its associated anode and cathode circuits is included only to provide a convenient starting arrangement. It is not essential to the invention. Suitable negative pulses could be applied direct from the source to the transfer electrodes 74 of tube MCT38.

Although multi-gap cold cathode gas-filled discharge tubes have been used in the circuits described above, each of which contains a group of static electrical switches, other static electrical switches may be employed in circuits according to the invention. For instance, such circuits may employ the more common three-electrode cold cathode tubes or corresponding thyratron tubes in the circuit interconnected for example, in groups of ten for each denominational order of a decade counter or frequency divider.

The invention is also applicable to counting circuits based upon notation other than the decimal one. With groups of switches arranged to count on a binary basis, for example, there could be two three-electrode cold cathode gas-discharge tubes in each group.

While the principles of the invention have been described above in connection with specific embodiments, and particular modifications thereof, it is to be understood that this description is made only by way of example and not as a limitation on the scope of the invention.

What we claim is:

1. An electric pulse responsive circuit comprising at least three groups of static electric switches, the groups being arranged in ascending denominational order and each group being operable cyclically in sequential fashion in response to pulses applied thereto, means for applying a sequence of input pulses to said first group of switches, whereby said switches are caused to operate in sequence, individual means connected between each two groups of switches and controlled by the completed sequential operation of all of the switches of the preceding group for causing the operation of the next unoperated switch in the succeeding group, and means including a direct coupling between each of said last-mentioned means except the first and two of the preceding groups of switches including said first for directly controlling each operation of a switch in the succeeding group by each of the preceding groups.

2. An electric pulse responsive circuit comprising at least three groups of static electric switches, the groups being arranged in ascending denominational order and each group being operable cyclically in sequential fashion in response to pulses applied thereto, means for applying a sequence of input pulses to said first group of switches, whereby said switches are caused to operate in sequence, means controlled by the completed sequential operation of all of the switches of said first group for causing the operation of a switch in the second group, and means including a direct coupling between said last-mentioned means and the last switch of each of the first and second groups for directly controlling each operation of a switch in the third group by the simultaneous actuation of the last switch in each of the preceding groups.

3. An electric pulse responsive circuit, as claimed in claim 1, further comprising means for making the operation of switches of other of said groups than said first group also dependent on the presence of an incoming pulse whereby the operation of a switch in said third group or in the succeeding groups, if any, is not only dependent upon the receipt of an incoming pulse but is also coincidental with such pulse reception.

4. A circuit, as claimed in claim 3, in which the means for making the operation of switches of other of the groups than the first group dependent on the presence of an incoming pulse cooperates with the individual means connected between each two groups of switches to form a plurality of pulse generating networks each feeding a different one of the said groups excepting the first group, further comprising means for making each of said networks operable once per cycle of the immediately preceding group and each directly controlled by each preceding group.

5. A circuit, as claimed in claim 4, in which the last switch of each group is arranged to produce an output condition as a result of its operation, and means responsive to such condition in each case for affecting the immediately following pulse generating network, so that it may be operable once per cycle of the immediately preceding group.

6. A circuit, as claimed in claim 4, comprising also further connections by means of which the incoming pulses are applied to each pulse generating network, whereby the operation of the latter is made dependent upon the presence of an incoming pulse.

7. A circuit, as claimed in claim 6 in which each of the said pulse generating networks comprises a cold cathode gas-filled discharge tube and an anode circuit which produces a negative-going pulse on the tube becoming conductive.

8. A circuit, as claimed in claim 7, wherein each of said discharge tubes is provided with a trigger electrode and each of the said connections to a pulse generating network from preceding groups is taken to the trigger electrode of the said discharge tube, and in which such connections each include a rectifier and together form a coincidence gate network, the presence of an incoming pulse and output condition being necessary on all of the appropriate connections before a striking potential can be applied to the discharge tube.

9. An electric pulse responsive circuit comprising at least three multi-gap, cold cathode, gas-filled discharge tubes, each operable in response to applied pulses cyclically to effect discharges across its main gaps in turn and each having one main cathode from which an output potential can be taken when that gap is conducting, an input conductor over which incoming pulses are applied to a first of said tubes effecting therein sequential stepping of the discharging condition always from one main gap to the next main gap, a cold cathode gas filled discharge tube pulse generating arrangement associated with each multi-gap tube and operable to apply a pulse to its associated tube when it becomes conducting itself, said pulse generating arrangement including a gating arrangement having a pair of inputs, and connections to the gating arrangement of each pulse generating arrangement except the first from the said one main cathode of every preceding multi-gap tube, whereby whenever potentials are simultaneously presented to a gating arrangement over all of said connections thereto, a pulse is applied to the associated multi-gap tube causing therein the discharging condition to step from the previously fired main gap to the next main gap in sequence.

10. A circuit, as claimed in claim 9, comprising also a further connection to the gating arrangement of each pulse generating arrangement from the said input conductor, whereby an incoming pulse is supplied to each said gating arrangement of said pulse generating arrangement in addition to and simultaneously with the output potential from preceding multi-gap tubes in order that a pulse may be supplied to the associated multi-gap tube.

References Cited in the file of this patent

UNITED STATES PATENTS

| | | |
|---|---|---|
| 2,402,372 | Compton et al. | June 18, 1946 |
| 2,427,533 | Overbeck | Sept. 16, 1947 |
| 2,473,159 | Lyman | June 14, 1949 |
| 2,503,127 | Mumma | Apr. 4, 1950 |

OTHER REFERENCES

Third Interim Progress Report of the Institute for Advanced Study, Princeton, New Jersey, January 1, 1948, pages 126–137.